US008000336B2

(12) United States Patent
Harel

(10) Patent No.: US 8,000,336 B2
(45) Date of Patent: Aug. 16, 2011

(54) SPANNING TREE ROOT SELECTION IN A HIERARCHICAL NETWORK

(75) Inventor: Alon Harel, Shoham (IL)

(73) Assignee: Voltaire Ltd., Ra'anana (IL)

( * ) Notice: Subject to any disclaimer, the term of this patent is extended or adjusted under 35 U.S.C. 154(b) by 155 days.

(21) Appl. No.: 12/426,970

(22) Filed: Apr. 21, 2009

(65) Prior Publication Data

US 2010/0265849 A1    Oct. 21, 2010

(51) Int. Cl.
*G01R 31/08* (2006.01)
*H04L 12/08* (2006.01)
(52) U.S. Cl. .................... 370/408; 370/218; 370/395.42
(58) Field of Classification Search .................. 370/216, 370/217, 218, 219, 220, 350, 392, 400, 401, 370/406, 407, 408, 410, 395.2, 395.3, 395.4
See application file for complete search history.

(56) References Cited

U.S. PATENT DOCUMENTS

| | | | | |
|---|---|---|---|---|
| 7,599,284 B1 * | 10/2009 | Di Benedetto et al. | ....... | 370/216 |
| 7,848,264 B1 * | 12/2010 | Gai et al. | ...................... | 370/256 |
| 2008/0219268 A1 * | 9/2008 | Dennison | .................. | 370/395.2 |

OTHER PUBLICATIONS

Clos, Charles, "A Study of Non-Blocking Switching Networks", Bell System Technical Journal 32, pp. 406-424, 1953.

Mellanox Technologies Inc., "Scaling 10Gb/s Clustering at Wire-Speed", Santa Clara, California, USA 2006.
IEEE 802.1D Standard "IEEE Standard for Local and Metropolitan Area Networks—Media Access Control (MAC) Bridges", IEEE Computer Society, USA, Jun. 9, 2004.
IEEE 802.1AX Standard "IEEE Standard for Local and Metropolitan Area Networks—Link Aggregation", IEEE Computer Society, USA, Nov. 3, 2008.
Turner et al., "Multirate Clos Networks", IEEE Communications Magazine, Oct. 2003.
Thayer School of Engineering, "An Slightly Edited Local Copy of Elements of Lectures 4 and 5", Dartmouth College, Jan. 15, 1998 http://people.seas.harvard.edu/~jones/cscie129/nu_lectures/lecture11/switching/clos_network/clos_network.html.

* cited by examiner

*Primary Examiner* — Hanh Nguyen
(74) *Attorney, Agent, or Firm* — D. Kligler I.P. Services Ltd.

(57) ABSTRACT

Communication apparatus includes a hierarchical network of switches, which includes at least a first plurality of spine switches, interconnected by a control channel, and a second plurality of edge switches having internal ports coupled to communicate via respective links with the spine switches and external ports for connecting to client devices. The spine switches are configured to detect, via the control channel, a partitioning of the hierarchical network into first and second partitions, including respective first and second numbers of the spine switches, wherein the first number is greater than the second number, and to assign respective priorities to the spine switches responsively to the first and second numbers so as to cause the larger of the partitions to be elected as a spanning tree root.

12 Claims, 3 Drawing Sheets

SPANNING TREE ROOT SELECTION IN A HIERARCHICAL NETWORK

FIELD OF THE INVENTION

The present invention relates generally to communication networks, and specifically to avoidance of loops in a hierarchical communication network.

BACKGROUND OF THE INVENTION

Various types of switching networks are known in the art. Some of these types have hierarchical topologies, meaning that the switches in the network are connected together in multiple stages (or levels). A signal input at one of the edge ports of the switching network, at the bottom of the hierarchy, must pass through one or more internal stages, at higher levels in the hierarchy, before reaching another edge port from which it is output. Some hierarchical networks are non-blocking, in the sense that any unused edge port can always be connected to any other unused edge port, regardless of existing connections within the network.

A Clos network is a kind of hierarchical switching network, which is also referred to as a CBB or Fat-Tree network. This type of network topology was first formalized by Charles Clos in "A Study of Non-Blocking Switching Networks," *Bell System Technical Journal* 32 (1953), pages 406-424. A Clos network is made up of crossbar switches arranged in interconnected stages, wherein the number of ports on each individual switch is typically much smaller than the total number of edge ports of the network. Although Clos networks were originally conceived for use in public switched telephone networks, they have gained popularity in some packet switching data applications. A review of some applications of this latter sort is provided in a white paper entitled "Scaling 10 Gb/s Clustering at Wire-Speed," published by Mellanox Technologies Inc. (Santa Clara, Calif., 2006), which is incorporated herein by reference.

The Spanning Tree Protocol (STP), defined in IEEE Standard 802.1D, is a network protocol that may be used to ensure a loop-free topology in any bridged local area network (LAN). As the protocol runs over the nodes of a network, it creates a tree of connections among the nodes, while disabling links that are not part of the tree, so that there is only a single active path between any two nodes. The above-mentioned white paper points out that the use of STP in a Clos network may cause problems of lost bandwidth and congestion.

SUMMARY OF THE INVENTION

An embodiment of the present invention provides communication apparatus, including a hierarchical network of switches. The network includes at least a first plurality of spine switches, interconnected by a control channel, and a second plurality of edge switches having internal ports coupled to communicate via respective links with the spine switches and external ports for connecting to client devices. The spine switches are configured to detect, via the control channel, a partitioning of the hierarchical network into first and second partitions, including respective first and second numbers of the spine switches, wherein the first number is greater than the second number, and to assign respective priorities to the spine switches responsively to the first and second numbers so as to cause one of the spine switches in the first partition to be elected as a spanning tree root.

In a disclosed embodiment, the hierarchical network includes a Clos network.

In some embodiments, the switches are configured to group the respective links from a given switch in the hierarchical network to the spine switches in the first and second partitions so as to define respective first and second link aggregation groups (LAGs). Running a spanning tree protocol over the hierarchical network causes the second LAG to be blocked while the hierarchical network is partitioned.

In one embodiment, the respective priorities are inversely proportional to the first and second numbers.

Typically, the spine switches are configured to elect respective master spine switches in the first and second partitions, and to assign the respective priorities to the master spine switches so that one of the master spine switches is elected as the spanning tree root.

There is also provided, in accordance with an embodiment of the present invention, a method for communication in a hierarchical network of switches, which includes at least a first plurality of spine switches, interconnected by a control channel, and a second plurality of edge switches having internal ports coupled to communicate via respective links with the spine switches and external ports for connecting to client devices. The method includes automatically detecting, via the control channel, a partitioning of the hierarchical network into first and second partitions, including respective first and second numbers of the spine switches, wherein the first number is greater than the second number. Respective priorities are automatically assigning to the spine switches responsively to the first and second numbers so as to cause one of the spine switches in the first partition to be elected as a spanning tree root.

The present invention will be more fully understood from the following detailed description of the embodiments thereof, taken together with the drawings in which:

DETAILED DESCRIPTION OF EMBODIMENTS

Overview

The embodiments of the present invention that are described hereinbelow provide novel hierarchical network configurations, and particularly methods for avoiding loops in hierarchical networks while maximizing available bandwidth. The disclosed networks comprise at least a first plurality of spine switches, interconnected by a control channel, and a second plurality of edge switches. The edge switches have internal ports coupled to communicate via respective links with the spine switches, and external ports for connecting to client devices. One of the spine switches is provisioned to serve as the master switch and STP root node. Messaging among the spine switches over the control channel makes it possible for the hierarchical network to appear externally to client devices as though it were a single switch, and thus to permit STP to run over the hierarchical network via the external ports without loss of internal bandwidth.

In the course of operation, a partitioning of the hierarchical network may occur, i.e., the spine switches may be split up into two or more partitions due to failures of one or more spine switches or of the control channel links connecting them. The spine switches are configured to detect this partitioning, typically by messaging via the control channel. This messaging also enables the spine switches in each partition to choose a new master switch for the partition and to determine the number of the spine switches in the partition. Based on these respective numbers, bridge priorities are assigned to the partitions by the spine switches themselves, such that the master switch of the larger partition receives the higher priority.

As a result, the next time STP runs over the hierarchical network, one of the spine-switches of the larger partition will be elected as the spanning tree root, and the edge switches will block the ports to the smaller partition (until the failure that led to the partitioning is resolved). Blocking the smaller partition will result in some loss of bandwidth, but loops will be avoided. Meanwhile, the choice of the larger partition to be the active partition will ensure that the largest possible number of spine switches, and hence the largest possible bandwidth, will remain available to serve client traffic.

System Description

Figure 1:
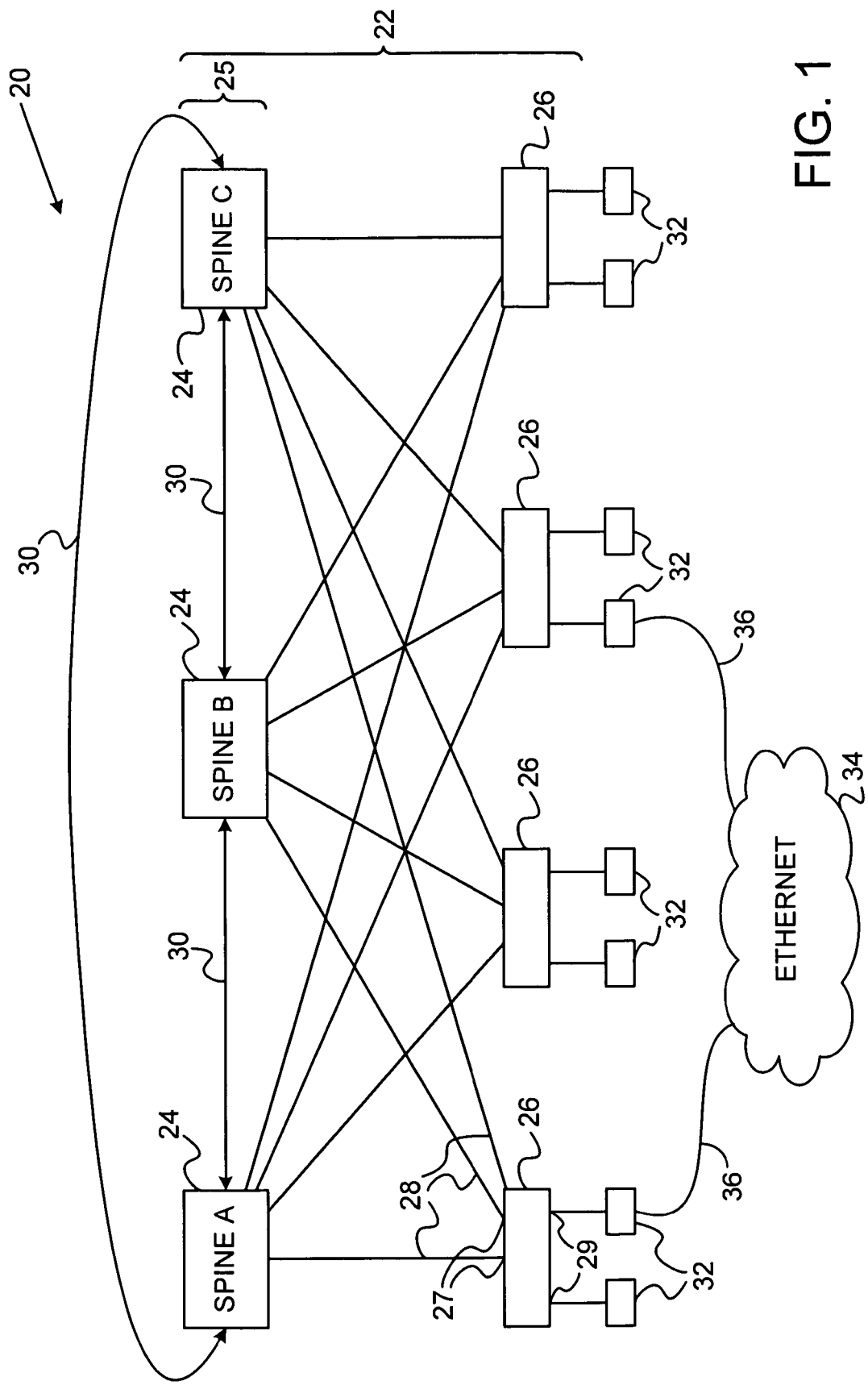
FIG. 1 is a block diagram that schematically illustrates a communication system, in accordance with an embodiment of the present invention.

FIG. 1 is a block diagram that schematically illustrates a communication system 20, in accordance with an embodiment of the present invention. System 20 is built around a hierarchical network 22, which in this example is built as a Clos network. The highest level in the hierarchy of network 22 is a spine 25, comprising spine switches 24 marked A, B and C in the figure. At the lowest level of the hierarchy, edge switches 26 comprise internal ports 27, which communicate via links 28 with the ports of the spine switches, and external ports 29, which connect to client devices 32 outside network 22. (Client devices 32 may comprise substantially any sort of network node, such as a host or a switch.) Switches 24 and 26 typically comprise crossbar packet switches, which switch packets between ingress and egress ports using forwarding tables, as are known in the art. The sort of configuration that is shown in FIG. 1 is sometimes referred to as a folded Clos network, since the external ports of the edge switches serve as both ingress and egress ports for signals to and from the client devices.

For the sake of simplicity of illustration, the hierarchical networks shown in the figures have only two levels (not counting the client devices): the spine and the edge switches. Each edge switch 26 in these networks is linked via ports 27 to every one of spine switches 24. The principles of the present invention, however, are equally applicable to hierarchical networks having one or more intermediate levels between the highest and lowest levels. Therefore, the statement that the internal ports of the edge switches are coupled to communicate via respective links with the spine switches should be understood to comprise both configurations in which the internal ports are linked directly to the spine switches, as in FIGS. 1 and 2, and configurations in which the internal ports communicate with the spine switches via one or more intermediate levels of switches. This latter type of configuration is shown, for example, in the above-mentioned white paper.

Spine switches 24 are interconnected by a control channel 30. In the examples shown in the figures, the control channel is configured as a ring, which provides robustness against single-point failures (since messages may be sent around the ring in either direction), but any other suitable control channel topology may alternatively be used. The spine switches use the control channel, inter alia, to synchronize forwarding information, so that all of the spine switches forward packets in the same manner (i.e., all spine switches will forward a packet having a given destination address to the same edge switch). Therefore, the spine switches together function logically as though they were a single extended switch. For this purpose, one of the spine switches is typically provisioned as the master switch and is responsible for collection and distribution of the forwarding information to the other spine switches.

Since spine switches 24 appear to edge switches 26 as a single logical switch, internal ports 27 of each edge switch may concomitantly be treated together as a single logical port. In other words, all of links 28 that are connected to each edge switch are grouped together by the edge switch as a single link aggregation group (LAG), over which all packets to and from spine 25 are forwarded. In such a LAG, any link 28 may be chosen by switch 26 for egress of an incoming packet, regardless of the destination address, and the actual physical port is chosen in each case based on load balancing considerations. For example, the physical port may be chosen based on the result of a suitable hash function applied to certain packet header parameters.

LAGs may be established in network 22 automatically, using the Link Aggregation Control Protocol (LACP) on both spine and edge switches. (LACP, as well as other aspects of link aggregation, is described in the IEEE 802.1AX-2008 standard, which was published November, 2008, and is incorporated herein by reference.) According to this protocol, each switch transmits its "System ID" to the other switches. When a given switch receives the same system ID on two or more of its ports, it can then aggregate the corresponding links into a single LAG. Spine switches 24 are synchronized via control channel 30 to transmit the same System ID, thus causing edge switches 26 to relate to the spine switches as a single logical switch.

The configuration of spine 25 as a single logical switch eliminates the possibility that there will be loops within network 22 itself. On the other hand, loops may still arise between client devices 32 and network 22. For example, as shown in FIG. 1, client devices 32 may be connected via links 36 to an Ethernet local area network (LAN) 34, whereby a looped path may be created via links 36, LAN 34, and network 22.

Loops of this sort may be eliminated by running STP over client devices 32, network 34, and edge ports 29 of network 22. For purposes of STP, one of spine switches 24, typically the master switch, is provisioned with a high bridge priority level (meaning a low numerical priority value, in accordance with STP convention). Proper provisioning of priority levels will result in the master spine switch being elected as the STP root in network 22. Edge switches 26 recognize the root and pass STP bridge protocol data units (BPDUs) to and from the root while the protocol is running. The remaining spine switches do not participate in the protocol. As a result of running STP, one of links 36 will be blocked in order to break the loop through network 34. Because spine 25 appears to edge switches 26 as a single logical switch, however, as explained above, none of internal ports 27 will be blocked.

Handling of Partitioning of the Hierarchical Network

Figure 2:
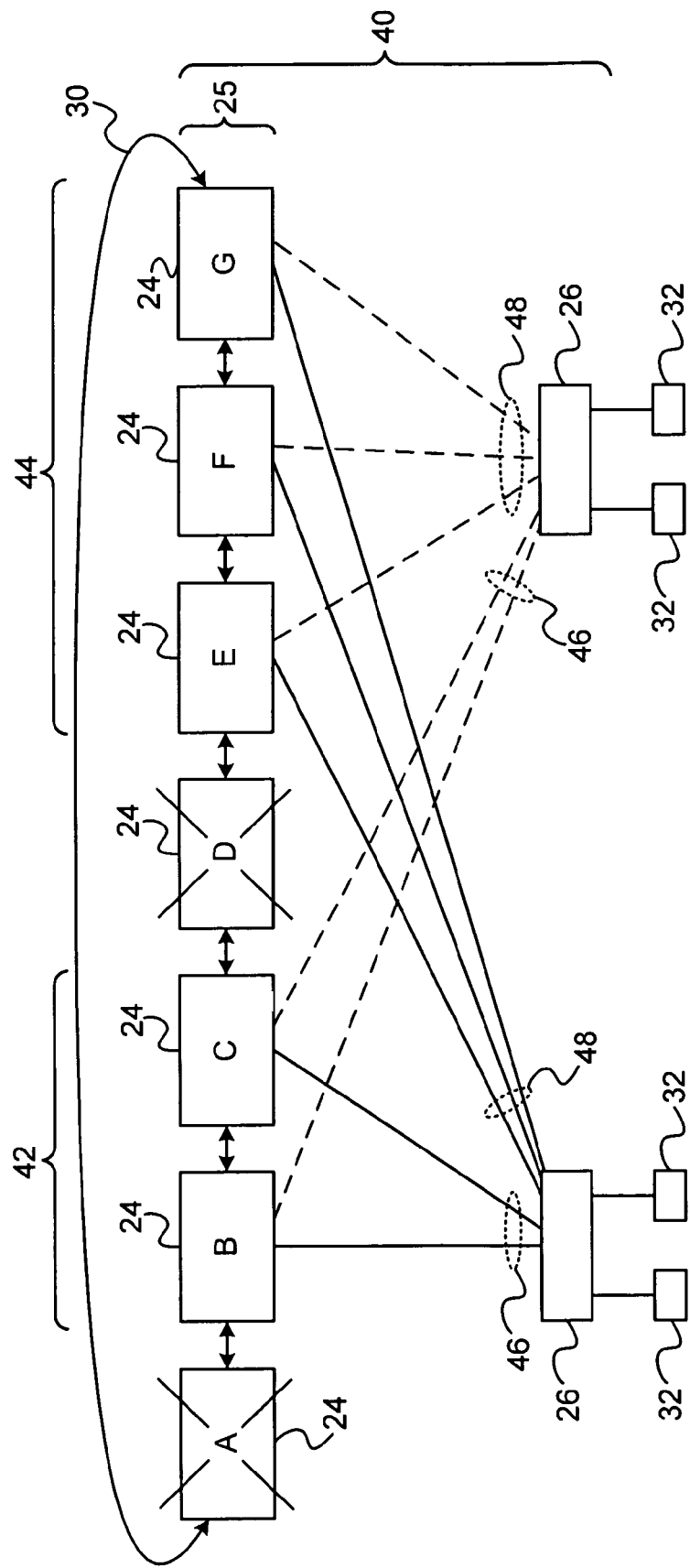
FIG. 2 is a block diagram that schematically illustrates handling of a failure in a hierarchical communication network, in accordance with an embodiment of the present invention.

FIG. 2 is a block diagram that schematically illustrates handling of a failure in a hierarchical communication network 40, in accordance with an embodiment of the present invention. Network 40 may be a Coos network, like network 22 in FIG. 1, but in this example comprises a large number of spine switches 24, labeled A, B, . . . , G. For the sake of simplicity, only two edge switches 26 are shown, both linked to all of the spine switches, while additional edge switches and intermediate levels that may be present in the network are omitted.

In the scenario shown in FIG. 2, two of the spine switches, labeled A and D, have failed, due to a power loss, for example. As a result, control channel 30 is broken, and the remaining, active spine switches are effectively split into two partitions: one partition 42 comprising switches B and C, and another partition 44 comprising switches E, F and G. The spine switches within each partition are able to exchange control messages with one another, to elect a partition master switch, and to synchronize their forwarding tables, as explained above. On the other hand, the separate partitions are unable to communicate or coordinate functions with one another.

In this situation, each partition will appear to edge switches 26 as a separate logical switch. Each edge switch will therefore group its links to spine 25 into two logical groups, as well: one LAG 46 of the links connecting to partition 42, and another LAG 48 of the links connecting to partition 44. In this situation, loops may arise within network 40. For example, a logical path exists in the network from the left-hand edge switch 26, to spine switch E, to right-hand edge switch 26, to spine switch C, and back to the left-hand edge switch. A solution to this problem is presented below.

Figure 3:
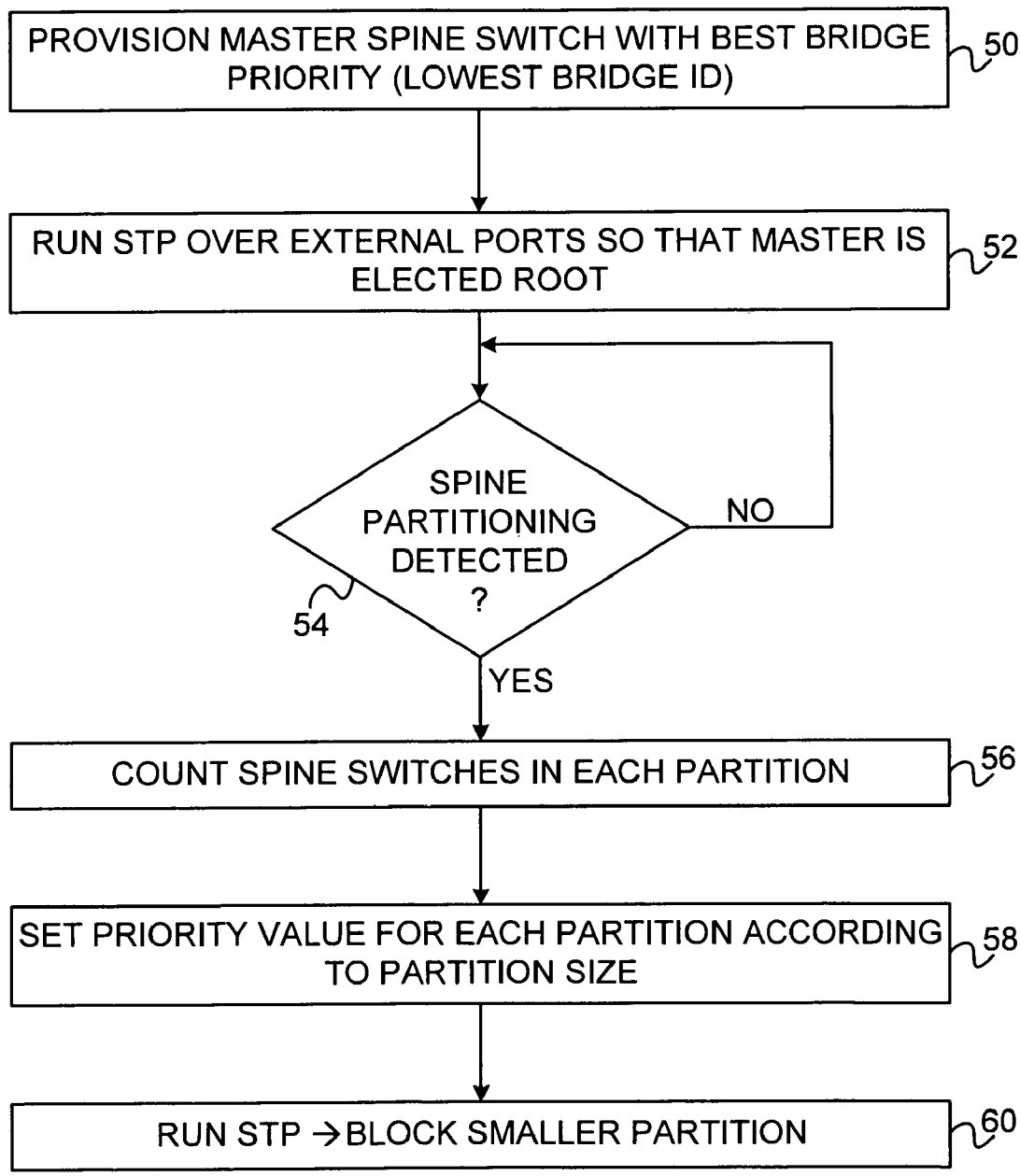
FIG. 3 is a flow chart that schematically illustrates a method for eliminating loops from a communication system, in accordance with an embodiment of the present invention.

FIG. 3 is a flow chart that schematically illustrates a method for eliminating loops from a communication system, in accordance with an embodiment of the present invention. The method is explained here, for the sake of clarity, with reference to network 40, shown in FIG. 2, but it may likewise be applied in other sorts of hierarchical networks, containing two or more levels.

Initially (before occurrence of the faults shown in FIG. 2), a master spine switch is chosen and provisioned with the best (highest) bridge priority in the system in question, at a provisioning step 50. As noted earlier, for purposes of STP, a high priority corresponds to a low priority value, which will result in the master spine switch having a low bridge identifier (ID) number. According to STP convention, the network node with the lowest bridge ID number is chosen as the root of the network. Thus, when STP is run over the external ports of switches 26, the master spine switch will be elected as the root, at an election step 52.

Network 40 and client devices 32 continue operating normally, in accordance with the STP configuration set at step 52, until a partitioning of spine 25 occurs, at a partitioning step 54. The partitioning is detected automatically by the spine switches remaining active after the failure that caused the partitioning. For example, the spine switches may regularly exchange heartbeat or polling messages over control channel 30, and may notify the other switches when a neighboring switch fails to respond. When two or more of the switches fail, the active switches conclude that a partitioning has occurred.

Typically, the active spine switches also signal edge switches 26 to notify them of the failure. This signaling causes the edge switches to break the previous grouping of all their physical links into a single LAG, since the spine is no longer able to function as a single logical switch. For example, the spine switches may temporarily disable their links to the edge switches. As a result, the edge switches will disband the existing LAG and will attempt to regroup the links to the spine switches when the links are once again enabled.

In each partition, a master spine switch is needed in order to restore the synchronization of the spine switches in the partition. If the original master spine switch remains active in one of the partitions, it may continue to serve as the master in that partition. Any partition that does not already contain the master spine switch elects a new master. For example, the switch with the lowest serial number in each partition may be chosen to be the partition master. The master spine switch in each partition takes over synchronization of the forwarding tables within the partition, as well as assignment of the respective System ID for purposes of LACP. The edge switches now organize separate LAGs 46 and 48, according to the different System IDs.

The master spine switch in each partition now counts the number of spine switches in the partition, at a switch counting step 56. Typically, the master switch exchanges messages with the other spine switches in its partition via control channel 30, and thus counts the number of spine switches that respond. The master switch in each partition then assigns itself a bridge priority value based on the count, at a priority setting step 58. The priority value is chosen so that the master switch of the larger partition will have a higher priority, for purposes of loop removal, than will the master switch of the smaller partition. This prioritization may be accomplished, for example, by having each master switch compute its own bridge priority according to a predetermined formula, in which the priority value is inversely proportional to the number of spine switches in the partition.

STP runs over client devices 32 and partitioned network 40, at a loop removal step 60. As a result of the priority values set at step 58, the master switch of partition 44 will be chosen as the root, and the links in LAGs 46 will accordingly be blocked. The bandwidth that was previously available via spine switches B and C will be lost until switches A and/or D are returned to service, but relatively greater bandwidth remains available via partition 44.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A communication system, comprising a hierarchical network of switches, which comprises at least:
   a first plurality of spine switches, interconnected by a control channel; and
   a second plurality of edge switches having internal ports coupled to communicate via respective links with the spine switches and external ports for connecting to client devices,
   wherein the spine switches are configured to detect, via the control channel, a partitioning of the hierarchical network into first and second partitions, comprising respective first and second numbers of the spine switches, wherein the first number is greater than the second number, and to assign respective priorities to the spine switches responsively to the first and second numbers so as to cause one of the spine switches in the partition having the greater number of the spine switches to be elected as a spanning tree root.

2. The system according to claim 1, wherein the hierarchical network comprises a Clos network.

3. The system according to claim 1, wherein the switches are configured to group the respective links from a given switch in the hierarchical network to the spine switches in the first and second partitions so as to define respective first and second link aggregation groups (LAGs).

4. The system according to claim 3, wherein running a spanning tree protocol over the hierarchical network causes the second LAG to be blocked while the hierarchical network is partitioned.

5. The system according to claim 1, wherein the respective priorities are inversely proportional to the first and second numbers.

6. The system according to claim 1, wherein the spine switches are configured to elect respective master spine switches in the first and second partitions, and to assign the respective priorities to the master spine switches so that one of the master spine switches is elected as the spanning tree root.

7. A method for communication, comprising:

in a hierarchical network of switches, which comprises at least a first plurality of spine switches, interconnected by a control channel, and a second plurality of edge switches having internal ports coupled to communicate via respective links with the spine switches and external ports for connecting to client devices, automatically detecting, via the control channel, a partitioning of the hierarchical network into first and second partitions, comprising respective first and second numbers of the spine switches, wherein the first number is greater than the second number; and automatically assigning respective priorities to the spine switches responsively to the first and second numbers so as to cause one of the spine switches in the partition having the greater number of the spine switches to be elected as a spanning tree root.

8. The method according to claim 7, wherein the hierarchical network comprises a Clos network.

9. The method according to claim 7, and comprising grouping the respective links from a given switch in the hierarchical network to the spine switches in the first and second partitions so as to define respective first and second link aggregation groups (LAGs).

10. The method according to claim 9, wherein running a spanning tree protocol over the hierarchical network causes the second LAG to be blocked while the hierarchical network is partitioned.

11. The method according to claim 7, wherein the respective priorities are inversely proportional to the first and second numbers.

12. The method according to claim 7, and comprising electing respective master spine switches in the first and second partitions, wherein automatically assigning the respective priorities comprises assigning the respective priorities to the master spine switches so that one of the master spine switches is elected as the spanning tree root.

* * * * *